United States Patent
Jamison et al.

(10) Patent No.: US 8,083,268 B2
(45) Date of Patent: Dec. 27, 2011

(54) COUPLING, JOINT AND METHOD FOR FIXEDLY AND SEALINGLY SECURING COMPONENTS TO ONE ANOTHER

(75) Inventors: Tommy L Jamison, Hernando, MS (US); Daniel W Griffith, Amory, MS (US)

(73) Assignee: Mueller Industries, Inc., Memphis, TN (US)

( * ) Notice: Subject to any disclaimer, the term of this patent is extended or adjusted under 35 U.S.C. 154(b) by 1596 days.

(21) Appl. No.: 11/256,596

(22) Filed: Oct. 21, 2005

(65) Prior Publication Data

US 2007/0090641 A1  Apr. 26, 2007

(51) Int. Cl.
    *F16L 17/00* (2006.01)
(52) U.S. Cl. .................. 285/374; 285/382.5
(58) Field of Classification Search ........... 285/915, 285/374, 233, 382.5
    See application file for complete search history.

(56) References Cited

U.S. PATENT DOCUMENTS

| | | | |
|---|---|---|---|
| 2,120,067 A | 6/1938 | Gray et al. | |
| 2,329,000 A | 9/1943 | Rembert | |
| 3,068,563 A | 12/1962 | Reverman | |
| 3,149,861 A | 9/1964 | Larsson | |
| 3,244,441 A | 4/1966 | Caudle | |
| 3,343,252 A | 9/1967 | Reesor | |
| 3,596,939 A | 8/1971 | Gibson | |
| 4,130,302 A | 12/1978 | Mitchell et al. | |
| 4,541,655 A * | 9/1985 | Hunter | 285/915 |
| 4,850,641 A | 7/1989 | Walker | |
| 5,067,751 A | 11/1991 | Walworth et al. | |
| 5,150,519 A | 9/1992 | Unewisse | |
| 5,168,618 A | 12/1992 | Unewisse et al. | |
| 5,484,174 A | 1/1996 | Gotoh et al. | |
| 6,059,338 A | 5/2000 | Diederichs | |
| 6,202,284 B1 | 3/2001 | Joblin et al. | |
| 6,241,290 B1 | 6/2001 | Foering | |
| 6,260,891 B1 | 7/2001 | Foering et al. | |
| 6,427,309 B1 | 8/2002 | Viegener | |
| 6,581,983 B1 | 6/2003 | Viegener | |
| 6,726,256 B2 | 4/2004 | Viegener | |
| 2002/0050041 A1 | 5/2002 | Viegener | |
| 2006/0138772 A1 | 6/2006 | Galante | |

FOREIGN PATENT DOCUMENTS

| | | |
|---|---|---|
| AU | B-53180/90 | 10/1991 |
| DE | 12 29 351 | 11/1966 |
| EP | 0 356 719 | 3/1990 |
| EP | 0 448 921 | 10/1991 |
| FR | 2321654 | 3/1977 |
| WO | WO 01/75349 | 10/2001 |
| WO | WO2005/017006 | 2/2005 |

OTHER PUBLICATIONS

Kitec: Best of Both Worlds! IPEK Inc. Copyright 2000.

* cited by examiner

*Primary Examiner* — Aaron Dunwoody
(74) *Attorney, Agent, or Firm* — Harness, Dickey & Pierce, P.L.C.

(57) ABSTRACT

A fitting that can include a body and a spacing element. The body can have an insertion end that defines a cavity and which includes an end face. The spacing element can extend into the cavity from the interior surface of the cavity and can be configured to engage the component when the component is inserted through the insertion end into the cavity so that the component is spaced apart from the interior surface of the cavity. An adhesive, such as a two-part epoxy, can collect about the spacing element and can form a band of adhesive that fixedly and sealingly couples the fitting to the component. A method of forming a joint is also provided.

20 Claims, 2 Drawing Sheets

COUPLING, JOINT AND METHOD FOR FIXEDLY AND SEALINGLY SECURING COMPONENTS TO ONE ANOTHER

The present invention generally relates to a joint between two components and more particularly to a joint that fixedly and sealingly couples two components together and a related joining method.

There has long been a need for joining two components in a manner that fixedly and sealingly couples the components to one another. One extremely common application concerns the coupling of copper tubing that is commonly employed to transmit potable water in a building.

Sweat soldering has long been used for the connection of components of copper based supply and distribution systems for potable water, especially in single family residential constructions, due to its durability and the relative ease with which lead-based solder connections could be made. Modern plumbing codes have mandated lead-free solders and water soluble fluxes and as such, the difficulty in making sweat solder connections has significantly increased, particularly where relatively large diameter copper tubing is utilized. More particularly, the lead-free solders and water soluble fluxes tend to be less tolerant of certain variables (e.g., the presence of oxidation and/or the use of excessive heat) than the lead-based solders and acid-based fluxes. Furthermore, sweat soldering can be relatively time consuming.

In an effort to eliminate the disadvantages of sweat solder connections, it was proposed that a two-part epoxy be employed to adhesively couple the tubing and connectors to one another. More specifically, it is known to apply a two-part epoxy adhesive between a copper tube and a copper fitting (the copper fitting being suitable for coupling to the copper tube via traditional sweat soldering). Such epoxies have performed well in fixedly coupling components to one another but have not performed well in forming a seal between the components. Our analyses reveal a failure mode wherein the sliding of the fitting onto the tubing (or the tubing into the fitting) has the effect of scraping the epoxy off relatively small portions of the tubing and/or the fitting so that a void was formed therebetween. While the epoxy generally has sufficient strength to couple the fitting and the tubing together, the presence of the void rendered the joint unsuitable for its intended function (e.g., to communicate a fluid, such as potable water or a refrigerant therethrough without leaking).

Another connection process that has been proposed employs fittings that utilize internal seals wherein the fittings are crimped directly to lengths or sticks of conventional hard drawn copper tubing. The Profipress system that is marketed by Viega GmbH & Co. KG of Attendorn, Germany, for example, includes an inner o-ring seal that is carried on an inner diameter of the fitting and which sealingly engages the copper tubing upon insertion into the fitting. A crimping tool is subsequently employed to crimp the fitting to the tubing to thereby fixedly couple the tubing and the fitting to one another. This system, however, is known to suffer from several drawbacks.

One such drawback concerns the sealing of the fitting to an outside surface of the copper tubing. It is well known in the art that the outside surface of a copper tube is relatively susceptible to imperfections (e.g., gouges, scratches and the like) during its formation via extrusion as well as to damage during shipping and storage. As such imperfections and damage may adversely affect the ability of the fittings to seal against the outer surface of the tubing, manufacturers of the copper tubing typically subject the extruded sticks of tubing to an eddy current test to verify the integrity of each stick's outside surface. This testing is costly and as we have found, leaks are possible even when the tubing conforms to published standards. Accordingly, it appears that a relatively time consuming manual inspection must be made of each tube prior to its coupling to a fitting.

Another drawback concerns the incompatibility of the known systems with lengths of annealed copper tubing. In this regard, the annealed copper tubing is readily deformable and thus the crimping process fails to secure the fitting and the annealed copper tubing together. Accordingly, plumbing contractors must equip themselves with two discrete sets of fittings: one set of crimp fittings that are compatible with the hard drawn sticks of tubing and another set of fittings (e.g., flare or compression fittings) that are compatible with the annealed coils of tubing.

Yet another drawback concerns the cost of the crimp-type fittings and the tooling for installing the crimp-type fittings. More specifically, the fittings are relatively heavy and can weigh 25% or more than a correspondingly sized sweat solder fitting. As copper is relatively expensive, the manufacture and use of these fittings can be disadvantageous from a cost perspective. Moreover, the tooling for installing (i.e., crimping) the fittings tends to be relatively expensive. As such, it can be relatively costly to equip a crew so that it will have the capability to install such fittings.

A further drawback concerns the joining of conduits in relatively high pressure applications, such as cooling or refrigerant systems that utilize the new high pressure refrigerants such as R410A and others. More specifically, the known crimp-type fittings appear to be incapable of use in relatively high pressure applications as the fitting tends to separate from the tube when subjected to elevated fluid pressures. Soldering or brazing can also be undesirable in high pressure applications where the fluid conduit is hard drawn (i.e., work hardened). The application of heat to facilitate the soldering or brazing operation can anneal the conduit and thereby significantly lower its tensile strength.

In view of the aforementioned disadvantages with the known connection systems, there remains a need in the art for a connection system that can be used to fixedly and sealingly couple components together that is both reliable and relatively inexpensive.

SUMMARY

In one form, the present teachings provide a fitting for sealingly and fixedly coupling to a component. The fitting can include a body, a spacing element and a stop. The body can have an insertion end that defines an end face and a cavity. The spacing element can extend into the cavity from an interior surface of the cavity. The spacing element can be configured to engage the component when the component is inserted through the insertion end and into the cavity. The stop can extend into the cavity and can be configured to prevent the component from being inserted into the cavity beyond a predetermined point. The spacing element is positioned between the stop and the end face of the insertion end such that the spacing element is spaced axially apart from the stop by a first distance and the spacing element is spaced axially apart from the end face by a second distance that exceeds the first distance.

In another form, the teachings of the present invention provide a fitting for sealingly and fixedly coupling to a component. The fitting can include a body and a spacing element. The body can define an insertion end with a cavity, which has an interior surface, and an end face. The spacing element extends from the interior surface into the cavity and is adapted to engage the component when the component is inserted through the insertion end and into the cavity so that the component is spaced apart from the interior surface of the cavity. The spacing element is positioned axially apart from the end face by an amount that is greater than or equal to about 16% of a length of a perimeter of the cavity.

In yet another form, the teachings of the present invention provide an assembly that includes a fitting, a centering element, a structure and an adhesive. The fitting has a body with an insertion end into which an internal cavity is formed. The insertion end has an end face and the internal cavity has an interior surface. The structure has an exterior surface and is inserted into the internal cavity. The spacing element is disposed between the interior surface of the body and the exterior surface of the structure. The adhesive couples the interior surface to the exterior surface and forms a band of adhesive about a perimeter of the internal cavity that abuts the spacing element. The band of adhesive, the spacing element, or both, form a seal between the fitting and the structure.

In still another form, the teachings of the present invention provide a method for forming a joint that includes: providing a fitting having a body, the body having an insertion end into which an internal cavity is formed, the insertion end having an end face, the internal cavity having an interior surface; providing a structure having an exterior surface; installing a spacing element to the fitting such that the spacing element engages the interior surface; applying an adhesive to at least one of the internal cavity and the exterior surface of the structure; and slidingly engaging the fitting and the structure to one another such that the spacing element supports the structure such that the exterior surface is spaced apart from the interior surface, the adhesive collecting about the spacing element as the fitting and the structure are slid together to form a band of adhesive adjacent the spacing structure that sealingly couples the fitting to the structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE VARIOUS EMBODIMENTS

Figure 1:
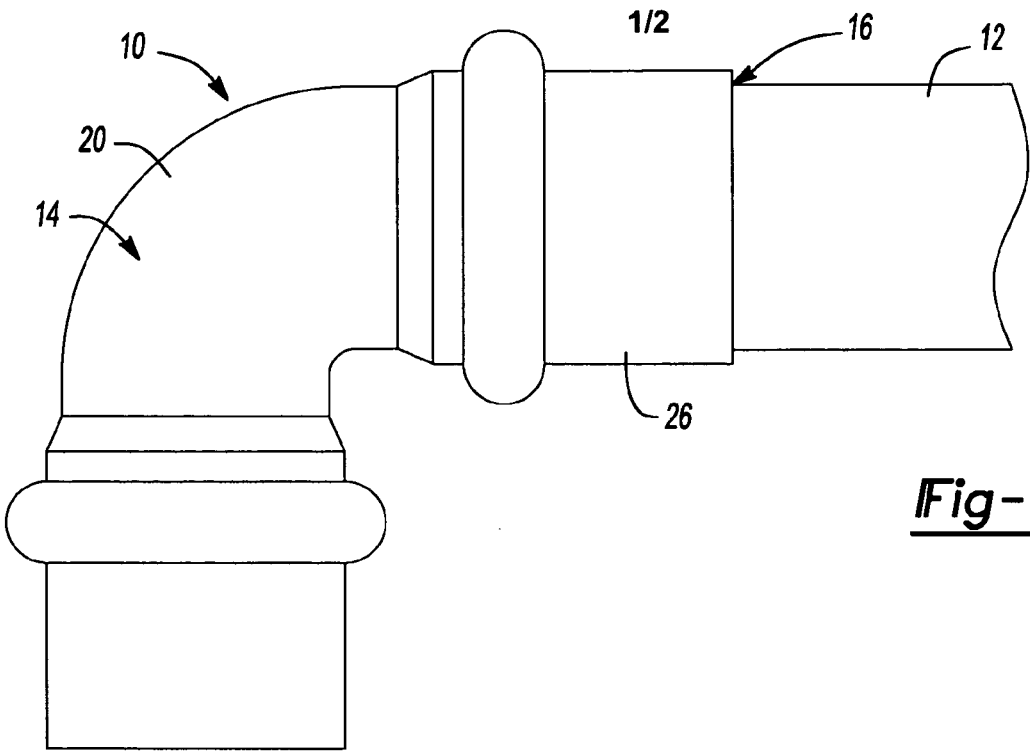
FIG. 1 is a front elevation view of an assembly constructed in accordance with the teachings of the present invention.

With reference to FIG. 1 of the drawings, an assembly constructed in accordance with the teachings of the present invention is generally indicated by reference numeral 10. With additional reference to FIG. 2, the assembly 10 can include a component or structure 12, a fitting 14, and an adhesive 16. In the particular example illustrated, the assembly 10 is suited for use in communicating (i.e., supplying, delivering, routing) a fluid, such as a gas or liquid and as such, the structure 12 is illustrated to be a length of tubing. More particularly, the structure 12 in the particular embodiment illustrated is a length of drawn (full hard) copper tubing that is suitable for use in a system for the transmission of potable water. It will be appreciated, however, that the teachings of the present invention have broader applicability and as such, the scope of the present disclosure (and appended claims) is not limited to the particular application of the invention described and illustrated herein but rather extends to any joint wherein the components of the joint are fixedly and sealingly joined by an adhesive in the manner disclosed herein. In this regard, it will be appreciated that the structure 12 need not be a tubular structure but rather could be any structure, such as a shaft, that sufficiently corresponds in size and shape to the fitting 14 so that the adhesive 16 may cooperate with the two to form a sealed or fluid-tight joint or connection therebetween.

Figure 2:
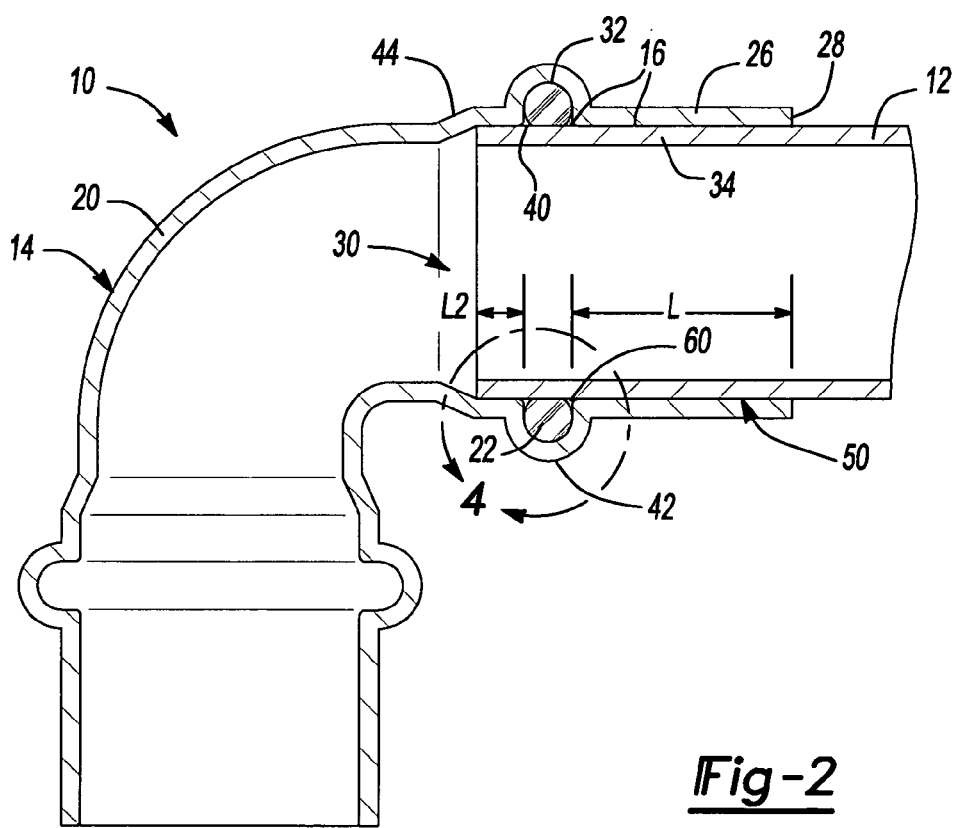
FIG. 2 is a longitudinal section view of the assembly of FIG. 1.
Figure 3:
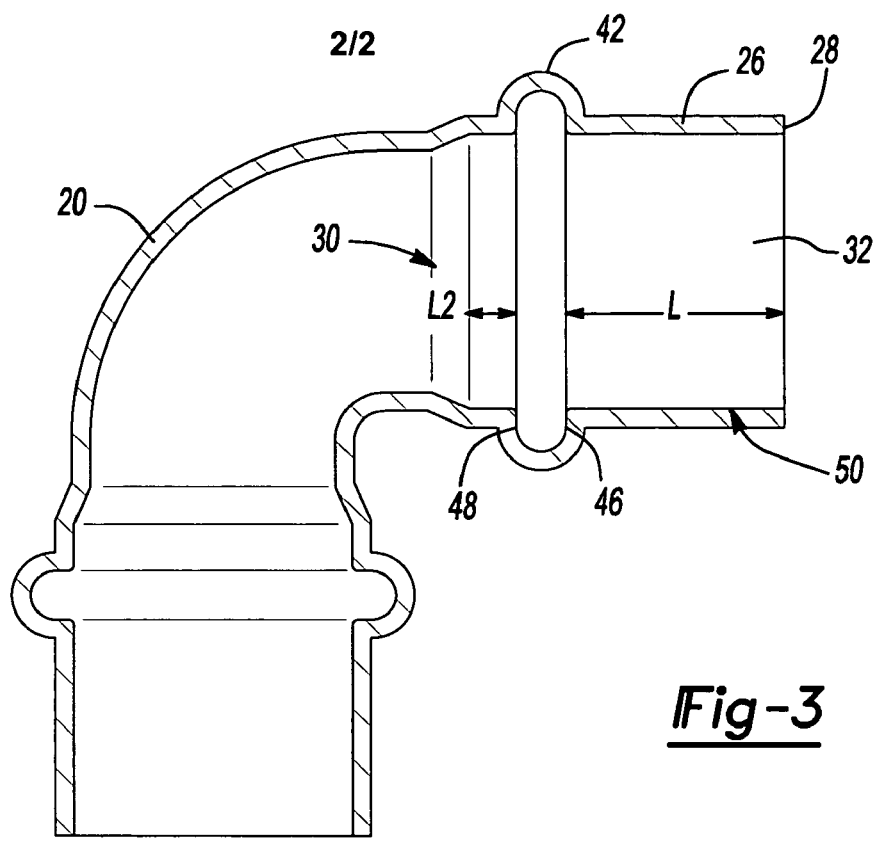
FIG. 3 is a longitudinal section view of a portion of the assembly of FIG. 1.

With reference to FIGS. 2 and 3, the fitting 14 can include a body 20 and a spacing element 22. It will be appreciated that although the particular fitting illustrated is a 90° elbow, the teachings of the present invention have applicability to various other types of fittings, including unions, tees, caps, adapters, reducers, bushings, etc.

The body 20 can be made from any structural material, such as plastic, ceramic, copper, brass, bronze, stainless steel or another metal. In the example provided, the body 20 is made of a copper alloy so as to eliminate the potential for a galvanic reaction with the copper alloy of the structure 12. The body 20 can include an insertion end 26 that can define an end face 28 and a cavity 30 having an interior surface 32. The cavity 30 can be configured to receive an associated end 34 of the structure 12.

The spacing element 22 can be housed in the body 20 and can contact the interior surface 32 of the cavity 30. The spacing element 22 can be an "endless" member, such as an O-ring, and can contact the interior surface 32 in a continuous (i.e., unbroken) manner about the perimeter of the cavity 30. Alternatively, the spacing element 22 could be formed in a discontinuous manner (e.g., with a plurality of voids) so as to contact the interior surface 32 in a correspondingly discontinuous manner. Moreover, the spacing element 22 can be formed from a resilient or deformable material.

The spacing element 22 can be sized to support the associated end 34 of the structure 12 within the cavity 30 so that the exterior surface 40 of the associated end 34 of the structure 12 is spaced apart from the interior surface 32 of the cavity 30 to form a space therebetween. In the particular example provided, the spacing element 22 is a resilient O-ring which sealingly engages the interior surface 32 and the exterior surface 40.

Optionally, the body 20 can include a mount 42 and a stop 44. The mount 42 can be configured to hold and position the spacing element 22 and the stop 44 can be a feature that inhibits the insertion of the structure 12 into the cavity 30 beyond a predetermined distance. For example, the mount 42 can be an annular recess with first and second wall members 46 and 48 that are spaced apart to receive the spacing element 22 therebetween, while the stop 44 can comprise a necked down area and/or one or more dimples and/or an annular roll (formed in the body 20) which can extend into the cavity 30. Where a necked down area is employed for the stop 44, it will be appreciated that the necked down area can support the associated end of the 34 of the structure 12 when the structure 12 is fully inserted to the fitting 14. The mount 42 (see, e.g., Profipress and ProPress® fittings marketed by Viega GmbH & Co. KG of Attendorn, Germany) and the stop 44 (see, e.g., Streamline™ fittings marketed by Mueller Industries, Inc. of Memphis, Tenn.) are elements that are well known in the art and as such, a detailed discussion of their configuration and/or operation is not needed herein.

The adhesive 16 can be any appropriate adhesive for sealingly bonding the structure 12 and the body 20 to one another. In the particular example provided, the adhesive 16 is a two-part epoxy, such as the DP460 Scotch-Weld™ epoxy adhesive that is marketed by Minnesota Mining and Manufacturing, Inc. of St. Paul, Minn., but it has been found that other adhesives, including the DP100 Plus Scotch-Weld™ epoxy adhesive and the DP-810NS Scotch-Weld™ acrylic adhesive that are marketed by Minnesota Mining and Manufacturing, Inc. of St. Paul, Minn. are also well suited for the exemplary assembly 10 described and illustrated herein. Those of ordinary skill in the art will appreciate that numerous considerations factor into the selection of a particular adhesive, including the shear strength of the adhesive, the peel strength of the adhesive, the viscosity of the adhesive, the worklife of the adhesive, the cure time of the adhesive, the cost of the adhesive, the chemical reactivity of the adhesive, the material compositions of the structure 12 and the fitting 14, the amount of clearance between the exterior surface 40 of the structure 12 and the interior surface 32 of the body 20, the working temperature of the assembly, and the amount of vibration (i.e., amplitude and frequency) that is transmitted through the assembly. Accordingly, it will be appreciated that the adhesive 16 is not limited to the particular adhesives that are specifically disclosed herein or to epoxy adhesives and/or acrylic adhesives generally.

With specific reference to FIG. 2, the spacing element 22 can be spaced axially apart from the end face 28 to define a coupling zone 50 having a length L. The length L of the coupling zone 50 can be selected to provide sufficient area so that the adhesive 16 will be sufficiently strong to fixedly couple the structure 12 and the body 20 to one another so that the assembly 10 can be subjected to a predetermined (maximum) pressure without failure of the assembly 10. We have found that the spacing element 22 can be positioned axially apart from the end face 28 by an amount (i.e., length L) that is greater than or equal to about 16% of a length of a perimeter of the cavity 30. More preferably, the spacing element 22 can be positioned axially apart from the end face by an amount (i.e., length L) that is greater than or equal to about 33% of the length of the perimeter of the cavity 30.

In contrast, the distance (i.e., length L2) between the spacing element 22 and the stop 44 is such that the length L is greater than or equal to the length L2. Preferably, the length L is at least about 50% greater than the length L2. More preferably, the length L is at least about 100% greater than the length L2. Still more preferably, the length L is at least about 500% greater than the length L2. Construction in this manner segregates the insertion end 26 into one portion (i.e., the coupling zone 50), which is employed to sealingly and fixedly couple the body 20 to the structure 12, and a second portion that is employed to ensure that the exterior surface 40 of the structure 12 is spaced apart from the interior surface 32 of the body 20 so that the length of the insertion end 26 is used efficiently. In this regard, the lengths of the respective portions can be tailored to the specific application so as to minimize the amount of material that is employed in the body 20 and the structure 12 to form the joint.

Advantageously, the fitting 14 and the structure 12 may be coupled to one another prior to the application of the adhesive 16. Where numerous such assemblies are to be employed, it can be advantageous to "dry fit" the various components and fittings to one another and thereafter disassemble the various components to apply the adhesive 16. The interior surface 32 (FIG. 3) of the cavity 30 and/or the exterior surface 40 of the structure 12 may undergo a surface treatment, such as mechanical or chemical cleaning prior to the application of the adhesive 16 to promote bonding and sealing. The adhesive 16 can be applied to the interior surface 32 (FIG. 3) of the cavity 30 and/or to the exterior surface 40 of the structure 12 (i.e., proximate the end face of the portion of the structure 12 that is to be inserted into the cavity 30). In our testing, the adhesive 16 was applied in to the interior surface 32 (FIG. 3) in a continuous annular (circular) bead, and to the exterior surface 40 of the structure 12 in a continuous annular (circular) bead for some samples and in a continuous zigzag bead (e.g., a series of several "W" shapes about the perimeter of the associated end 34 of the structure 12, with each "W" shape touching adjacent "W" shapes) for other samples. Thereafter, the structure 12 was inserted to the cavity 30.

As the spacing element 22 is an O-ring in the example provided, the spacing element 22 tends to center the structure 12 within the cavity 30 so as to form a space of a relatively uniform dimension about the perimeter of the structure 12. The space provides a void into which the adhesive 16 is permitted to flow and the uniformity of this space or void ensures that the adhesive 16 will be distributed in a relatively uniform manner throughout the coupling zone 50 so that the body 20 and the structure 12 will be fixedly coupled to one another when the adhesive 16 cures.

Figure 4:
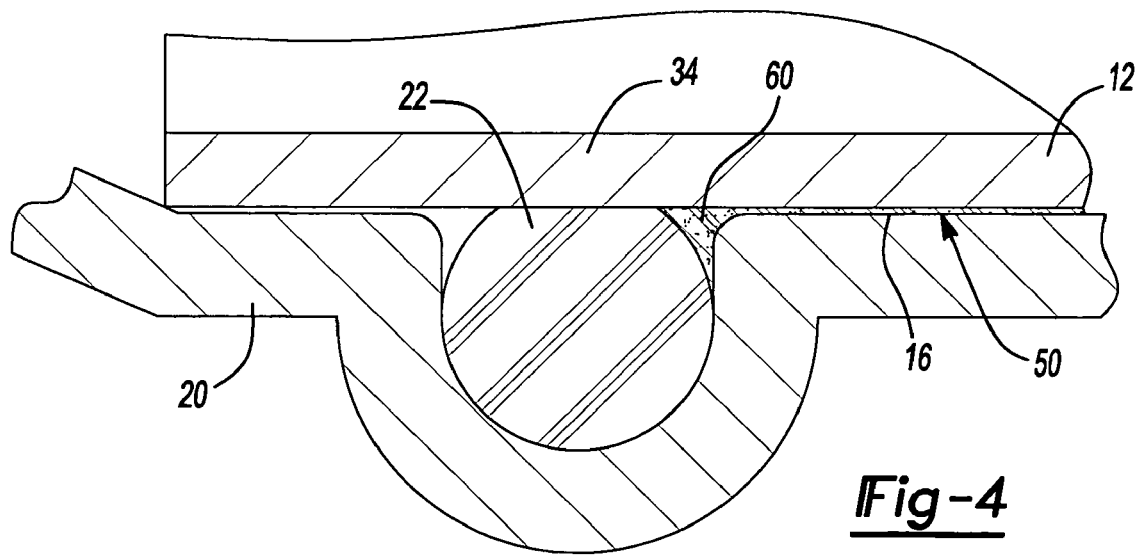
FIG. 4 is an enlarged portion of FIG. 2.

With additional reference to FIG. 4, the spacing element 22 can collect a portion of the adhesive 16 (that is wiped off the portion of the associated end 34 of the structure 12) that slides by the spacing element 22, causing the adhesive 16 to form a band of adhesive 60 that abuts the spacing element 22, the body 20 and the structure 12. As the band of adhesive 16 is continuous about the perimeter of the connection between the body 20 and the structure 12, it will be appreciated that its presence ensures a fluid-tight connection between the body 20 and the structure 12.

Moreover, the presence of the spacing element 22, the application of shear forces to the liquid adhesive 16 (caused by the sliding action between the structure 12 and the fitting 14), or both, can cause the adhesive 16 to flow backward along the structure 12 as the structure 12 is slid into the body 20. The backward flow of adhesive 16 can completely fill the space between the exterior surface 40 of the structure 12 and the interior surface 32 of the cavity 30 in the coupling zone 50 so that maximum mechanical coupling can be achieved between the structure 12 and the fitting 14.

Those of ordinary skill in the art will appreciate from this disclosure that the band of adhesive 60 and/or the filled space between the exterior surface 40 of the structure 12 and the interior surface 32 of the cavity 30 can form a positive seal between the structure 12 and the body 20. Moreover, those of ordinary skill in the art will appreciate from this disclosure that the positive seal can minimize concerns for the surface condition of the exterior surface 40 of the structure 12. As noted above, crimp-type fittings rely on the formation of a seal between an exterior surface of a tube and an O-ring that is carried by a fitting. In instances where the exterior surface of the tube has been damaged (e.g., scratches, gouges and the like), the O-ring may not seal against the tube. In contrast, an assembly constructed in accordance with the teachings of the present invention employs an adhesive that can fill gouges, scratches and the like in the exterior surface 40 of the structure 12.

While the invention has been described in the specification and illustrated in the drawings with reference to various embodiments, it will be understood by those of ordinary skill in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An assembly comprising:
    a fitting having a body, the body having an insertion end into which an internal cavity is formed, the insertion end having an end face, the internal cavity having an interior surface;
    a structure having an exterior surface, the structure being inserted into the internal cavity;
    a spacing element disposed between the interior surface and the exterior surface; and
    an adhesive coupling the interior surface to the exterior surface, the adhesive forming a band of adhesive about a perimeter of the internal cavity that abuts the spacing element;
    wherein the band of adhesive, the spacing element, or both, form a seal between the fitting and the structure.

2. The assembly of claim 1, wherein the spacing element is formed of a resilient material.

3. The assembly of claim 1, wherein the spacing element is an endless member.

4. The assembly of claim 3, wherein the spacing element is an O-ring.

5. The assembly of claim 1, wherein the structure is a tube.

6. The assembly of claim 1, wherein the fitting is formed of a metallic material.

7. The assembly of claim 1, wherein the adhesive is a two-part epoxy.

8. The assembly of claim 1 wherein the fitting further comprises a stop extending into the internal cavity and adapted to prevent the structure from being inserted into the internal cavity beyond a predetermined point;
    wherein the spacing element is positioned between the stop and the end face of the insertion end such that the spacing element is spaced axially apart from the stop by a first distance and the spacing element is spaced axially apart from the end face by a second distance, the second distance being greater than or equal to the first distance.

9. The assembly of claim 8, wherein the second distance is at least 50% greater than the first distance.

10. The assembly of claim 9, wherein the second distance is at least 100% greater than the first distance.

11. The assembly of claim 10, wherein the second distance is at least 500% greater than the first distance.

12. The assembly of claim 1, wherein a cross-section of the internal cavity taken perpendicular to a longitudinal axis of the insertion end has a circular shape.

13. The assembly of claim 1, wherein the spacing element is an endless member, wherein the structure is a tube, wherein the adhesive is a two-part epoxy and wherein the fitting further comprises a stop extending into the internal cavity and adapted to prevent the structure from being inserted into the internal cavity beyond, a predetermined point; and
    wherein the spacing element is positioned between the stop and the end face of the insertion end such that the spacing element is spaced axially apart from the stop by a first distance and the spacing element is spaced axially apart from the end face by a second distance, the second distance being greater than or equal to the first distance.

14. The assembly of claim 13, wherein the second distance is at least 50% greater than the first distance.

15. The assembly of claim 14, wherein the second distance is at least 100% greater than the first distance.

16. The assembly of claim 15, wherein the second distance is at least 500% greater than the first distance.

17. The assembly of claim 1, wherein a cross-section of the internal cavity taken perpendicular to a longitudinal axis of the insertion end has a circular shape.

18. A method for forming a joint comprising:
    providing a fitting having a body, the body having an insertion end into which an internal cavity is formed, the insertion end having an end face, the internal cavity having an interior surface;
    providing a structure having an exterior surface;
    installing a spacing element to the fitting such that the spacing element engages the interior surface;
    applying an adhesive to at least one of the internal cavity and the exterior surface of the structure; and
    slidingly engaging the fitting and the structure to one another such that the spacing element supports the structure and spaces the exterior surface apart from the interior surface, the adhesive collecting about the spacing element as the fitting and the structure are slid together to form a band of adhesive adjacent the spacing structure that sealingly couples the fitting to the structure.

19. A method for forming a joint comprising:
    providing a fitting having a body, the body having an insertion end into which an internal cavity is formed, the insertion end having an end face, the internal cavity having an interior surface;
    providing a structure having an exterior surface;
    installing a spacing element to the structure such that the spacing element engages the exterior surface;
    applying an adhesive to at least one of the internal cavity and the exterior surface of the structure; and
    slidingly engaging the fitting and the structure to one another such that the spacing element supports the structure and spaces the exterior surface apart from the interior surface, the adhesive collecting about the spacing element to form a band that sealingly couples the fitting to the structure.

20. A method for forming a joint comprising:
    providing a fitting having a body, the body having an insertion end into which an internal cavity is formed, the insertion end having an end face, the internal cavity having an interior surface;
    providing a structure having an exterior surface;
    installing a spacing element to the fitting such that the spacing element engages the interior surface;
    forming a stop extending into the internal cavity and adapted to prevent the structure from being inserted into the internal cavity beyond a predetermined point;
    wherein the spacing element is positioned between the stop and the end face of the insertion end such that the spacing element is spaced axially apart from the stop by a first distance and the spacing element is spaced axially apart from the end face by a second distance, the second distance being greater than or equal to the first distance;

applying an adhesive to at least one of the internal cavity and the exterior surface of the structure; and slidingly engaging the fitting and the structure to one another such that the spacing element supports the structure and spaces the exterior surface apart from the interior surface, the adhesive collecting about the spacing element as the fitting and the structure are slid together to form a band of adhesive adjacent the spacing structure that sealingly couples the fitting to the structure.

* * * * *